US008940458B2

(12) United States Patent
Braithwaite et al.

(10) Patent No.: US 8,940,458 B2
(45) Date of Patent: Jan. 27, 2015

(54) FUEL SUPPLY FOR A FUEL CELL

(75) Inventors: Daniel Braithwaite, San Francisco, CA (US); Jesse Thomas, San Francisco, CA (US); Adam Rodriguez, San Francisco, CA (US); Tobin Fisher, San Francisco, CA (US); Tibor Fabian, Mountain View, CA (US)

(73) Assignee: Intelligent Energy Limited, Loughborough (GB)

( * ) Notice: Subject to any disclaimer, the term of this patent is extended or adjusted under 35 U.S.C. 154(b) by 647 days.

(21) Appl. No.: 12/908,845

(22) Filed: Oct. 20, 2010

(65) Prior Publication Data

US 2012/0100443 A1    Apr. 26, 2012

(51) Int. Cl.
*H01M 8/04* (2006.01)
*H01M 8/06* (2006.01)
*H01M 2/14* (2006.01)

(52) U.S. Cl.
CPC .................. *H01M 8/06* (2013.01); *Y02E 60/50* (2013.01); *Y02E 60/528* (2013.01)
USPC ............................ 429/515; 429/516; 429/410

(58) Field of Classification Search
CPC ....................................................... H01M 8/06
USPC .................................. 429/411, 410, 515, 516
See application file for complete search history.

(56) References Cited

U.S. PATENT DOCUMENTS

| 3,262,801 | A | 7/1966 | Lally et al. |
| 3,774,589 | A | 11/1973 | Kober |
| 4,042,528 | A | 8/1977 | Abe |
| 4,261,956 | A | 4/1981 | Adlhart |
| 4,419,457 | A | 12/1983 | Tokunaga |
| 4,846,176 | A | 7/1989 | Golden |
| 5,182,046 | A | 1/1993 | Patton et al. |
| 5,804,329 | A | 9/1998 | Amendola |

(Continued)

FOREIGN PATENT DOCUMENTS

| DE | 4221492 A | 1/1993 |
| EP | 1434292 A | 6/2004 |

(Continued)

OTHER PUBLICATIONS

Definition of course work technical terms. Southwest Tech, 2002-2006. [Retrieved on Feb. 8, 2012]. Retrieved from the Internet <URL: http://www.swtc.edu/Ag_Power/hydraulics/terms.htm.

(Continued)

*Primary Examiner* — Helen O Conley
(74) *Attorney, Agent, or Firm* — Baker and Hostetler LLP

(57) ABSTRACT

The present invention discloses a fuel supply for a fuel cell, the fuel cell including a liquid storage area that includes a liquid reactant, a reaction area that includes a solid reactant, wherein the liquid reactant is pumped into the reaction area such that the liquid reactant reacts with the solid reactant to produce reaction components, a product collection area that receives the reaction components, a barrier, and a container with an interior volume that substantially encloses the reaction area, liquid storage area, product collection area. The barrier separates and defines several of the aforementioned areas, and moves to simultaneously increase the product collector area and decrease the liquid storage area as the liquid reactant is pumped from the liquid storage area and the reaction components are transferred into the product collection area.

27 Claims, 4 Drawing Sheets

(56) References Cited

U.S. PATENT DOCUMENTS

| | | | |
|---|---|---|---|
| 5,817,157 A | 10/1998 | Checketts | |
| 5,948,558 A | 9/1999 | Amendola | |
| 6,106,801 A | 8/2000 | Bogdanovic et al. | |
| 6,250,078 B1 | 6/2001 | Amendola | |
| 6,326,097 B1 | 12/2001 | Hockaday | |
| 6,375,638 B2 | 4/2002 | Nason | |
| 6,392,313 B1 | 5/2002 | Epstein | |
| 6,433,129 B1 | 8/2002 | Amendola | |
| 6,468,694 B1 | 10/2002 | Amendola | |
| 6,497,973 B1 | 12/2002 | Amendola | |
| 6,524,542 B2 | 2/2003 | Amendola | |
| 6,534,033 B1 | 3/2003 | Amendola | |
| 6,534,950 B2 | 3/2003 | Leboe | |
| 6,544,400 B2 | 4/2003 | Hockaday | |
| 6,544,679 B1 | 4/2003 | Petillo | |
| 6,579,068 B2 | 6/2003 | Bridger | |
| 6,586,563 B1 | 7/2003 | Ortega | |
| 6,645,651 B2 | 11/2003 | Hockaday | |
| 6,660,685 B1 | 12/2003 | Schussler | |
| 6,670,444 B2 | 12/2003 | Amendola | |
| 6,683,025 B2 | 1/2004 | Amendola | |
| 6,706,909 B1 | 3/2004 | Snover et al. | |
| 6,713,201 B2 | 3/2004 | Bullock | |
| 6,723,072 B2 | 4/2004 | Flaherty | |
| 6,745,801 B1 | 6/2004 | Cohen | |
| 6,746,496 B1 | 6/2004 | Kravitz et al. | |
| 6,808,833 B2 | 10/2004 | Johnson | |
| 6,818,334 B2 | 11/2004 | Tsang | |
| 6,821,499 B2 | 11/2004 | Jorgensen | |
| 6,834,632 B2 | 12/2004 | Kataoka et al. | |
| 6,840,955 B2 | 1/2005 | Ein | |
| 6,849,351 B2 | 2/2005 | Hartnack | |
| 6,887,596 B2 | 5/2005 | Leban | |
| 6,893,755 B2 | 5/2005 | Leboe | |
| 6,916,159 B2 | 7/2005 | Rush | |
| 6,924,054 B2 | 8/2005 | Prasad | |
| 6,932,847 B2 | 8/2005 | Amendola et al. | |
| 6,939,529 B2 | 9/2005 | Strizki et al. | |
| 7,019,105 B2 | 3/2006 | Amendola et al. | |
| 7,083,657 B2 | 8/2006 | Mohring et al. | |
| 7,105,033 B2 | 9/2006 | Strizki | |
| 7,105,245 B2 | 9/2006 | Ohlsen | |
| 7,108,777 B2 | 9/2006 | Xu et al. | |
| 7,214,439 B2 | 5/2007 | Ortega et al. | |
| 7,220,290 B2 | 5/2007 | Amendola et al. | |
| 7,282,073 B2 | 10/2007 | Petillo et al. | |
| 7,316,718 B2 | 1/2008 | Amendola et al. | |
| 7,316,719 B2 | 1/2008 | Devos | |
| 7,323,148 B2 | 1/2008 | Shah et al. | |
| 7,393,369 B2 | 7/2008 | Shurtleff | |
| 7,527,661 B2 | 5/2009 | Chellappa et al. | |
| 7,530,931 B2 | 5/2009 | Amendola et al. | |
| 7,540,892 B2 | 6/2009 | Strizki et al. | |
| 7,645,536 B2 | 1/2010 | Akiyama | |
| 7,662,435 B2 | 2/2010 | Chellappa et al. | |
| 7,666,386 B2 | 2/2010 | Withers-Kirby | |
| 7,811,529 B2 | 10/2010 | Powell et al. | |
| 7,867,300 B2 | 1/2011 | Chellappa et al. | |
| 7,875,089 B2 | 1/2011 | Powell et al. | |
| 7,922,781 B2 | 4/2011 | Chellappa et al. | |
| 7,954,519 B2 | 6/2011 | Powell et al. | |
| 8,100,993 B2 | 1/2012 | Fisher et al. | |
| 2002/0114985 A1 | 8/2002 | Shkolnik et al. | |
| 2002/0182459 A1 | 12/2002 | Hockaday | |
| 2003/0009942 A1 | 1/2003 | Amendola | |
| 2003/0022034 A1 | 1/2003 | Suzuki | |
| 2003/0037487 A1 | 2/2003 | Amendola et al. | |
| 2003/0077494 A1 | 4/2003 | Aberle et al. | |
| 2003/0082427 A1 | 5/2003 | Prasad | |
| 2003/0091879 A1 | 5/2003 | Rusta-Sellehy et al. | |
| 2003/0138679 A1 | 7/2003 | Prased | |
| 2003/0198558 A1 | 10/2003 | Nason | |
| 2003/0235724 A1 | 12/2003 | Ord | |
| 2004/0011662 A1 | 1/2004 | Xu | |
| 2004/0013923 A1 | 1/2004 | Molter et al. | |
| 2004/0048115 A1 | 3/2004 | Devos | |
| 2004/0048132 A1 | 3/2004 | Takai et al. | |
| 2004/0052704 A1 | 3/2004 | Devos | |
| 2004/0062965 A1 | 4/2004 | Morse | |
| 2004/0062978 A1 | 4/2004 | Yazici | |
| 2004/0096721 A1 | 5/2004 | Ohlsen et al. | |
| 2004/0131903 A1 | 7/2004 | Shioya | |
| 2004/0136156 A1 | 7/2004 | Nakamura et al. | |
| 2004/0148857 A1 | 8/2004 | Strizki | |
| 2004/0197214 A1 | 10/2004 | Arthur | |
| 2004/0202548 A1 | 10/2004 | Dai | |
| 2004/0211054 A1 | 10/2004 | Morse | |
| 2004/0219409 A1 | 11/2004 | Isogai | |
| 2004/0229101 A1 | 11/2004 | Davis | |
| 2004/0253500 A1 | 12/2004 | Bourilkov | |
| 2005/0023236 A1 | 2/2005 | Adams et al. | |
| 2005/0031931 A1 | 2/2005 | Kabumoto et al. | |
| 2005/0036941 A1 | 2/2005 | Bae et al. | |
| 2005/0037245 A1 | 2/2005 | Pham | |
| 2005/0037252 A1 | 2/2005 | Pham | |
| 2005/0074641 A1 | 4/2005 | Inai et al. | |
| 2005/0089415 A1 | 4/2005 | Cho et al. | |
| 2005/0158595 A1 | 7/2005 | Marsh et al. | |
| 2005/0181250 A1 | 8/2005 | Beckmann et al. | |
| 2005/0238573 A1 | 10/2005 | Zhang et al. | |
| 2006/0059778 A1 | 3/2006 | Shurtleff et al. | |
| 2006/0073365 A1 | 4/2006 | Kaye | |
| 2006/0110639 A1 | 5/2006 | Walter | |
| 2006/0127734 A1 | 6/2006 | Mclean et al. | |
| 2006/0172694 A1 | 8/2006 | Gau et al. | |
| 2006/0194082 A1 | 8/2006 | Tucker et al. | |
| 2006/0196112 A1 | 9/2006 | Berry | |
| 2006/0275645 A1 | 12/2006 | Gallagher et al. | |
| 2007/0002172 A1 | 1/2007 | Calvignac et al. | |
| 2007/0020172 A1 | 1/2007 | Withers-Kirby et al. | |
| 2007/0031711 A1 | 2/2007 | Miyata et al. | |
| 2007/0036711 A1 | 2/2007 | Fisher et al. | |
| 2007/0037034 A1 | 2/2007 | Fisher et al. | |
| 2007/0042244 A1 | 2/2007 | Spallone | |
| 2007/0068071 A1 | 3/2007 | Kelly et al. | |
| 2007/0120872 A1 | 5/2007 | Satoh | |
| 2007/0122668 A1 | 5/2007 | Suzuki et al. | |
| 2007/0166595 A1 | 7/2007 | Akiyama et al. | |
| 2007/0189960 A1 | 8/2007 | Yamamoto | |
| 2007/0264546 A1 | 11/2007 | Laven | |
| 2008/0025880 A1 | 1/2008 | Shurtleff et al. | |
| 2008/0044691 A1 | 2/2008 | Wake et al. | |
| 2008/0187798 A1 | 8/2008 | Mclean et al. | |
| 2008/0203816 A1 | 8/2008 | Fujita | |
| 2008/0220297 A1 | 9/2008 | Sarata et al. | |
| 2008/0292541 A1 | 11/2008 | Kamada et al. | |
| 2009/0092864 A1 | 4/2009 | Mclean et al. | |
| 2009/0117420 A1 | 5/2009 | Nakakubo | |
| 2009/0197125 A1 | 8/2009 | Salvador et al. | |
| 2009/0269634 A1 | 10/2009 | Fabian et al. | |
| 2009/0274595 A1 | 11/2009 | Fisher et al. | |
| 2009/0304558 A1 | 12/2009 | Patton et al. | |
| 2010/0150824 A1 | 6/2010 | Withers-Kirby | |
| 2010/0173214 A1 | 7/2010 | Fabian et al. | |
| 2011/0020215 A1 | 1/2011 | Ryu et al. | |
| 2011/0053016 A1 | 3/2011 | Braithwaite et al. | |
| 2011/0070151 A1 | 3/2011 | Braithwaite et al. | |
| 2011/0159386 A1 | 6/2011 | Kaupert et al. | |
| 2011/0200495 A1 | 8/2011 | Braithwaite et al. | |
| 2011/0311895 A1 | 12/2011 | Spare et al. | |
| 2011/0313589 A1 | 12/2011 | Iyer et al. | |

FOREIGN PATENT DOCUMENTS

| | | |
|---|---|---|
| JP | 2002/234358 | 8/2002 |
| JP | 2002234358 A | 8/2002 |
| JP | 2006079891 A | 3/2006 |
| JP | 2007157587 A | 6/2007 |
| WO | 0012889 A1 | 3/2000 |
| WO | 04/001235 | 12/2003 |
| WO | 04001235 A | 12/2003 |
| WO | 2004/062978 | 4/2004 |
| WO | 2005049485 A | 6/2005 |
| WO | 2005057703 A | 6/2005 |

(56) References Cited

FOREIGN PATENT DOCUMENTS

| | | |
|---|---|---|
| WO | 2005123586 A | 12/2005 |
| WO | 2006093735 A | 9/2006 |
| WO | 2007021924 A | 2/2007 |
| WO | 2007021934 A | 2/2007 |
| WO | 2007035845 A | 3/2007 |
| WO | 2007055146 A | 5/2007 |
| WO | 2007109036 A | 9/2007 |
| WO | 2007120872 A | 10/2007 |
| WO | 2011011050 A | 1/2011 |
| WO | 2011028242 A | 3/2011 |
| WO | 2012054787 A | 4/2012 |
| WO | 2012058688 A | 5/2012 |

OTHER PUBLICATIONS

Schlesinger et al, "Sodium Borohydride, Its Hydrolysis and its Use as a Reducing Agent and in the Generation of Hydrogen," J. Am. Chem. Soc.; vol. 75 (Mar. 15, 1952), pp. 215-219.

Laser et al., "A Review of Micropumps," J. Micromech. Microeng.; vol. 14 (2004) R35-R64.

Wu, "Hydrogen Storage via Sodium Borohydride: Current Status, Barriers & R&D Roadmap," Presentation presented at GCEP, Stanford University, Apr. 14-15, 2003.

D.J. Laser and J.G. Santiago, "A Review of Micropumps" J. Micromech. Microeng.; vol. 14 (2004) R35-R64.

Ying,Wu, "Hydrogen Storage via Sodium Borohydride: Current Status, Barriers & R&D Roadmap" Presentation presented at GCEP, Stanford University, Apr. 14-15, 2003.

Written Opinion of te International Searching Authority for PCT/US2010/02022.

FUEL SUPPLY FOR A FUEL CELL

TECHNICAL FIELD

This invention relates generally to a fuel supply for a fuel cell, and more specifically to a fuel supply that contains both the reactants and waste products of the fuel production.

BACKGROUND

Fuel cells, especially hydrogen fuel cells, have received increasing interest as on-demand, portable power sources. In particular, there has been an increased interest in leveraging fuel cell technology to power portable consumer devices, especially as battery replacements. Fuel cells are exceptionally interesting as battery replacements because not only do fuel cells present fewer environmental concerns than batteries, but they have an exceptionally longer lifespan, as fuel cells produce electricity only when needed. Thus, fuel cells can be theoretically used for an unlimited period of time as long as the fuel supply, which provides the fuel that the fuel cell consumes to generate electricity, is periodically replaced. This fuel supply can be pure-fuel storage, such as a tank of hydrogen gas, or it can be a fuel generator that utilizes chemical precursors (such as a sodium borohydride slurry or dry sodium borohydride and water) to generate the fuel. The latter option is often preferred due to the higher fuel stability.

In order for the fuel cell to power portable electronics on-demand, both the fuel cell and the fuel supply must be portable and preferably, easily incorporated into the electronic device itself. While prior art fuel cells can be incorporated easily into a portable package, even incorporated into the product itself, prior art fuel supplies cannot be as easily incorporated into the product due to size limitations. Because the fuel-generating reaction produces corrosive waste products, not only does the fuel supply need to store enough reactant(s) to provide adequate energy density, but it also needs to store the waste products produced by the fuel-generating reactions. Additionally, the storage of the reactant(s) and waste products is preferably accomplished in a fixed volume, as expansion of a fuel supply may damage any device that the fuel supply has been incorporated into.

Thus, there is a need in the fuel supply field to create an improved fuel supply that contains both the requisite reactants and the generated waste products.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1A:
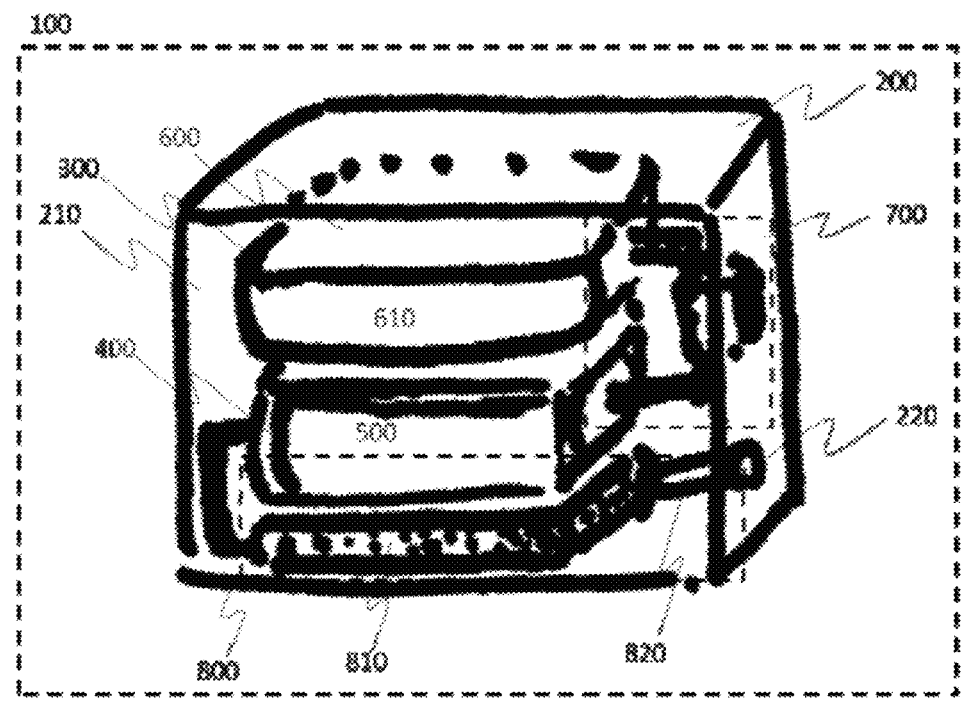
FIGS. 1A and 1B are schematic representations of a first embodiment of the fuel supply before and after the fuel supply is operated, respectively.
Figure 1B:
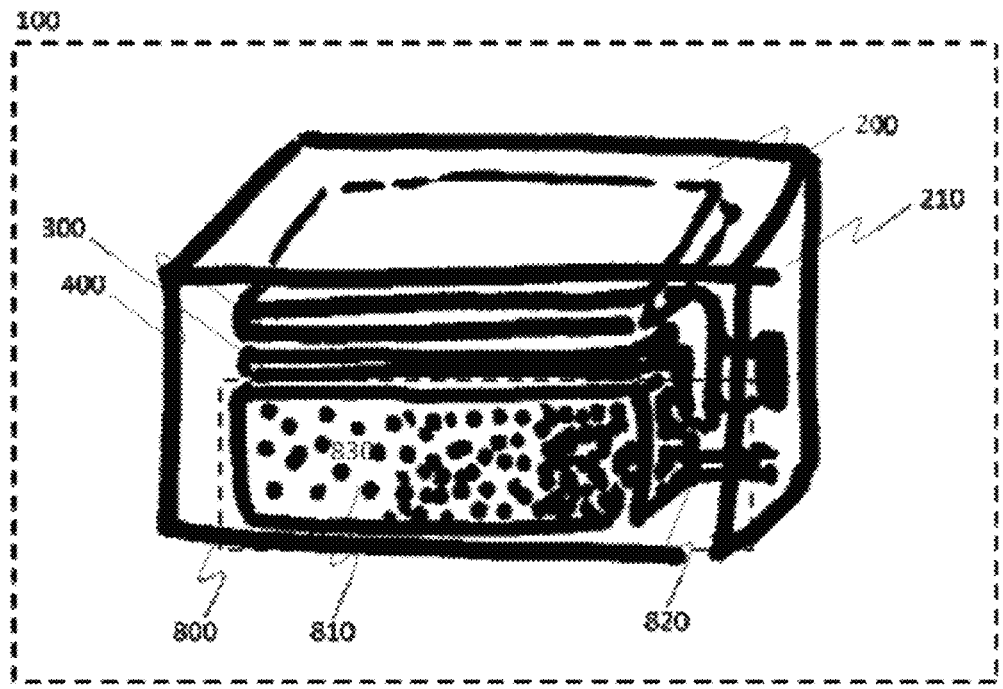

As shown in FIGS. 1A and 1B, the fuel supply 100 of the preferred embodiment includes a reaction area 400, a liquid storage area 600, a product collection area 800, a barrier 300, and an outer container 200. The fuel supply 100 additionally includes a solid fuel storage composition (herein solid reactant) 500 and a liquid reactant 610, wherein the reaction between the solid reactant 500 and the liquid reactant 610 generates the fuel (e.g., hydrogen gas). The fuel supply 100 may additionally include a liquid dispenser 700. The fuel supply is preferably used to provide fuel for a fuel cell or fuel cell stack controlled by a controller such as that described in U.S. Ser. No. 12/583,925, which is incorporated in its entirety by this reference. The fuel cell and fuel supply combination is preferably used to power portable consumer devices such as laptop computers, cell phones, and portable media players, but may additionally be used to power medical devices, heating/cooling devices, vehicles, or any other application that requires a power source. Many of these applications require fuel supplies that are small, portable, and convenient-fuel supplies that provide as much fuel as possible in as small a package as possible. The fuel supply 100 of the present invention provides this desired fuel supply by containing both the reactants and waste products in a single container, wherein the reactants and waste products are separated by a barrier that can move to simultaneously increase the waste product space and decrease the reactant space as the reactants are consumed to generate fuel. In doing so, the fuel supply 100 can provide several advantages. First, the fuel supply can minimize the required size of the fuel supply cartridge. As the fuel is being generated, the waste products of the fuel generation replace the space vacated by the consumed reactants, such that the majority of the cartridge space is used at all times. By effectively utilizing most of the cartridge space all the time, the cartridge size is minimized because the cartridge no longer has to accommodate volumes that are not always used. Second, no additional components (such as a waste container or a liquid supply) are necessary, since everything is contained within the cartridge. Third, the small size of the fuel supply can allow it to be easily integrated into consumer devices, especially portable consumer devices, and can be made to be disposable so that the fuel supply can be used in the same manner as a conventional battery.

The outer container 200 of the fuel supply 100 of the preferred embodiment functions to contain the reaction area 400, liquid storage area 600 and the product collection area 800, to mechanically protect the contents of the fuel supply 100, and to provide a fixed volume for fuel generation. The outer container 200 is preferably constructed of a material that is corrosion resistant, liquid impermeable, and heat resistant, such that reaction components 830 will not corrode or leak through the outer container 200. Additionally, the outer container 200 is preferably substantially fluidly sealed such that non-fuel reaction components 830 do not leak through. The outer container 200 is preferably rigid, but may alternatively be semi-rigid, flexible, or a combination of rigidities. Materials that the outer container 200 may be made of include plastics (e.g., Polyethylene, PEEK, polypropylene), metals (e.g., stainless steel, Aluminum), ceramics (e.g., silicon carbide, kaolinite, glass), or a combination of the aforementioned materials (e.g., metal lined plastic). The outer container 200 is preferably small enough to be inserted into a laptop or a cell phone, but may alternatively be any size, such as that of a car battery or even larger. The outer container 200 is preferably in the form of a prism (with or without rounded edges and corners), but may alternatively be a cylinder, a sphere, or a container of any shape and size. The outer container 200 is preferably formed from two pieces that are welded together, but may alternatively be milled from a single piece, sintered from powder, several pieces or one piece welded together, two pieces that are mechanically joined (e.g., by using screws, clasps, hooks, or other joining mechanisms) or multiple pieces that are glued together. The outer container 200 may additionally include a clear section such that the contents of the interior volume may be viewed. The outer container 200 preferably includes inlets, outlets 220 or valves fluidly connecting the inside of the container to the outside for the purposes of adding more reactants, transferring fuel to a fuel cell, releasing built up pressure, or for any other purpose wherein materials need to be introduced or removed from the interior of the container.

The barrier 300 of the fuel supply 100 of the preferred embodiment functions to substantially fluidly isolate one area from another area within the container, and moves to simultaneously increase the volume of one area while decreasing the volume of another area, thereby facilitating the replacement of one area by another. The barrier 300 is preferably located between the liquid storage area 600 and the product collection area 800, but may additionally be located between the liquid storage area 600 and the reaction area 400 or between the reaction area 400 and the product collection area 800. The barrier 300 is preferably impermeable to both fluids and gasses such that it has a high gas barrier, but may alternately be impermeable to fluids only and allow gasses to flow through. The barrier 300 is preferably flexible and configures to the shape of the contents of the area, but may alternatively define the shape of the area's contents (e.g., an elastic sheath 320 or an elastic band), or may be rigid wherein the barrier's 300 position is determined by the largest dimension of the area's contents only. The barrier 300 is preferably a bag enclosing an area, but may alternatively be a bag that encloses two areas, a bag that encloses multiple areas with dividers that substantially fluidly separate the enclosed areas from each other, a flexible membrane attached to the interior wall of the container or a rigid sheet that runs on guiderails on the interior wall of the container. The fuel supply 100 preferably includes three barriers 300 enclosing the three aforementioned areas, but may alternatively include one barrier 300 separating one area from the other two, two barriers 300 that separate the interior container volume into the three areas, four barriers 300 wherein one of the areas has an extra barrier 300 enclosing it, or any number of barriers 300 as necessary. The barrier 300 is preferably made from polymers such as polyolefins, PEEK, PTFE, or polyethylene, but may alternatively be made from metals such as aluminum or stainless steel as well. The barrier 300 is preferably comprised of a single layer of a material, but may be comprised of two layers (e.g., metal lined plastic), five layers (e.g., alternating layers of plastic and metal), or any number of layers. Additionally, the barrier 300 may be coated to change the barrier's 300 physical properties, such as improving lubricity, improving heat transfer, or decreasing gas permeability. The barrier 300 may also include openings that allow different areas (e.g., reaction area 400, liquid storage area 600, product collection area 800) to be fluidly connected.

Figure 2A:
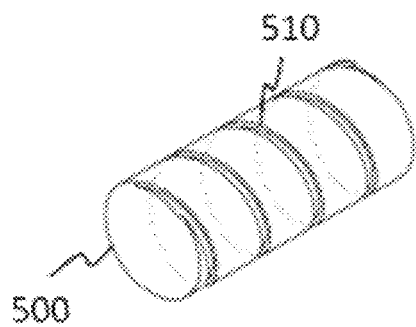
FIGS. 2A and 2B are schematic representations of two variations of the solid reactant guide groove.
Figure 2B:
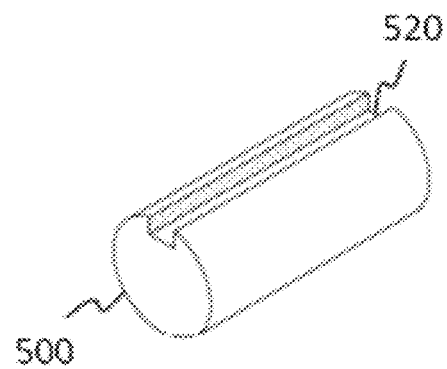
Figure 3A:
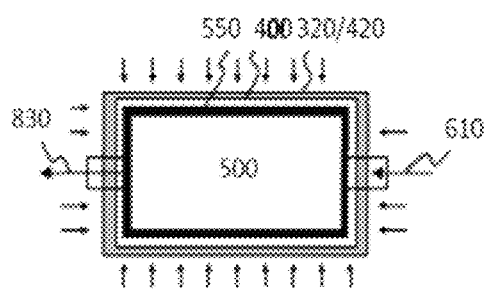
FIGS. 3A and 3B are schematic representations of the positioning of a first biasing mechanism at an initial instance of operation and a later instance of operation, respectively.
Figure 3B:
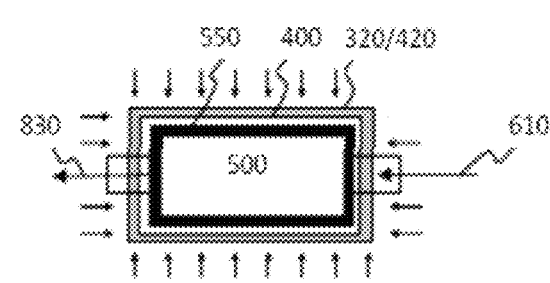

The reaction area 400 of the fuel supply 100 of the preferred embodiment functions to contain a solid reactant 500 and to facilitate the initiation of the fuel-generating reaction. The reaction area 400 may be unbounded such that it is not exactly defined, but is preferably bounded and defined by a barrier 300. The reaction area 400 preferably occupies a substantial portion of the outer container's 200 inner volume 210 before the solid reactant 500 is reacted, as shown in FIG. 1A, and preferably shrinks in volume as the fuel supply 100 is operated (and the solid reactant 500 consumed), as shown in FIG. 1B. The solid reactant 500 contained by the reaction area 400 functions to store fuel in a chemical precursor, wherein reaction of the reactant generates the desired fuel. The solid reactant 500 preferably includes a hydrogen storage composition, such as sodium borohydride ($NaBH_4$), aluminum hydride ($AlH_3$), or ammonia borane, but may alternatively be any fuel precursor that generates fuel upon reaction with a liquid reactant 610. The solid reactant 500 is preferably solid and compacted into a rod, but may alternatively be a hollow cylinder, a powder, a cylinder with a groove along its length, pellets, or any shape or configuration. As shown in FIGS. 2A and 2B, the solid reactant 500 may additionally include guide grooves that guide the reaction components 830 (reaction products and unreacted reactants) toward the product collector. Examples of the guide grooves include a channel 520 disposed on a surface of the solid reactant 500 (shown in FIG. 2B), a channel disposed through the solid reactant 500, a helix channel 510 disposed around the solid reactant 500 (shown in FIG. 2A), a contained region disposed around the solid reactant 500, and a conduit abutting the solid reactant 500. The reaction area 400 preferably includes a biasing mechanism that biases the solid reactant 500 toward the liquid dispenser 700 to promote a reaction. In practical cases, volatile fuel-producing reactions (such as a hydrolysis reaction) leave cavities or voids on the surface of a solid reactant 500 when the reaction components 830 flow away from the reaction zone. Because the reaction control of a solid fuel supply 100 (such as a sodium borohydride system) relies on both the pumping rate of the liquid reactants 610 and the size of a reaction interface, the inclusion of a biasing mechanism is desirable to maintain contact between the liquid reactant 610 being dispensed and a sizable solid reactant 500 surface. The biasing mechanism preferably achieves this function by providing compression on at least one side of the solid reactant 500, such that the solid reactant 500 is disposed toward the dispensed liquid reactant 610 or the dispensed liquid reactant 610 is disposed toward the solid reactant 500. This biasing mechanism is preferably an elastic membrane 420 enveloping the solid reactant 500 such that it also serves as a barrier 300, as shown in FIGS. 3A and 3B, but may additionally or alternatively be a spring 410 disposed on the end of the solid reactant 500 opposite the liquid dispenser 700, an elastic band running though the center of the solid reactant 500, or a heat-shrinkable sheet disposed around the solid reactant 500. The reaction area 400 preferably includes the reaction control mechanism described in U.S. Ser. No. 12/803,965, which is incorporated in its entirety by this reference, but may alternatively/additionally include other solid reactant 500s, biasing mechanisms, or reaction control mechanisms.

The liquid storage area 600 of the fuel supply 100 of the preferred embodiment functions to store a liquid reactant 610. The liquid storage area 600 may be unbounded such that it is not exactly defined within the outer container 200, but is preferably bounded and defined by a barrier 300. The liquid storage area 600 preferably occupies a substantial portion of the outer container's 200 inner volume 210 before the liquid reactant 610 is pumped out of the liquid storage area 600, as shown in FIG. 1A, and preferably shrinks in volume as the fuel supply 100 is operated (and the liquid reactant 610 consumed), as shown in FIG. 1B. The liquid reactant 610 functions to generate a fuel, such as hydrogen gas, upon reaction with the solid reactant 500 held in the reaction area 400. The liquid reactant 610 is preferably water, but may alternatively be a solution of water and acid (e.g. citric acid, succinic acid, malic acid or boric acid), wherein the acid preferably has a pH less than 2. The liquid storage area 600 preferably includes an outlet 710 to the liquid dispenser 700, wherein the outlet is preferably located within the outer container 200, but may alternatively be located on the wall of outer container 200 such that the outlet is in fluid communication with the outside of outer container 200. The liquid storage area 600 may also be configured such that the contained liquid reactant 610 may be accessed at all times during the operation of the fuel supply 100. The preferred configuration to accomplish this is for the liquid storage area 600 to be under vacuum, but orientation independence may also be accomplished by substantially removing gas from the liquid storage area 600, having a barrier 300 that minimizes the ingress of gas into the liquid storage area 600 (e.g., an elastic bag that shrinks when liquid reactant 610 is removed such that gas does not flow in), or incorporating a structure 620 that ensures fluid contact between the liquid reactant 610 and the outlet 710, which may or may not be coupled to the liquid dispenser 700. The structure 620 preferably prevents liquid storage area 600 kinking due to the structure's stiffness. The structure 620 is preferably flexible enough to allow the liquid storage area 600 to be bent and manipulated, but stiff enough to prevent the liquid storage area 600 from kinking. The structure 620 may also ensure fluid communication between the liquid reactant 610 and outlet 710 due to its thickness (e.g. diameter), wherein the structure 620 is thick enough to prevent the walls of the liquid storage area 600 from completely contacting each other. Additionally, it is preferable for the structure 620 to be as long as (and run the length of) the liquid storage area 600, but the structure 620 may be as long as the width of the liquid storage area 600, be longer than the largest dimension of the liquid storage area 600, or be shorter than the shortest dimension of the liquid storage area 600. The structure is preferably made of plastic, but may alternatively be made of metal. Examples of the structure 620 include: a length of thin, flexible plastic thread (e.g. fishing line) threaded through the liquid storage area 600 such that the stiffness of the fishing line prevents kinking, wherein the fishing line is longer than the length of the liquid storage area and is folded within the liquid storage area 600; a thin, flexible tube, located within the liquid storage area 600, that is the length of the liquid storage area 600 and is fluidly coupled to the liquid dispenser 700; and a length of shape-memory material (e.g. nitinol) that is run along the width of the liquid storage area 600.

Figure 4:
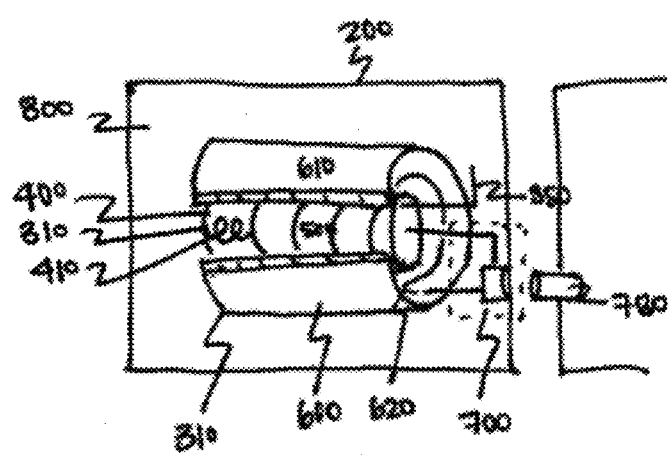
FIGS. 4 and 5 are schematic representation of a second and third embodiment of the fuel supply in operation, respectively.

The liquid dispenser 700 of the fuel supply 100 of the preferred embodiment functions to pump liquid reactant 610 from the liquid storage area 600 and dispense it into the reaction area 400, preferably close to the solid reactant 500 surface. As shown in FIG. 4, the liquid dispenser 700 is preferably located within the outer container 200, but may alternatively be partially located within the outer container 200 such that the liquid reactant 610 is substantially contained within the outer container 200 during the operation of the fuel supply 100, as shown in FIGS. 1A and 1B, or be located outside of the outer container 200. The liquid dispenser 700 preferably comprises of an inlet 710 fluidly coupled to the liquid storage area 600 (wherein the liquid dispenser inlet is the same structure as the liquid storage area outlet), an outlet 720 fluidly coupled to the reaction area 400, and a surface 730 fluidly coupled to the inlet 710 and outlet 720, wherein movement of the surface 730 by an external actuator 780 (as shown in FIG. 4) moves the liquid reactant 610 from the liquid storage area 600 to the reaction area 400. The surface 730 is preferably a flexible diaphragm coupled to an actuator 780 (located outside of the outer container 200), such that when the actuator reciprocates, it pushes against the diaphragm such that the diaphragm pumps liquid from the inlet 710 to the outlet 720. The surface 730 may alternatively be part of a tube connecting the inlet 710 to the outlet 720, wherein the tube is disposed around a peristaltic pump such that rotation of a rotor pushes liquid reactant 610 from the inlet 710 to the outlet 720. The liquid dispenser 700 is preferably diaphragm of the fluid pump described in U.S. Ser. No. 11/203,001 (which is incorporated in its entirety by this reference) and utilizes the referenced system to pump the liquid reactant, but the liquid dispenser may also utilize any other positive displacement pump that moves the liquid dispenser to pump fluid from the liquid storage area 600 to the reaction area 400. The liquid dispenser 700 may additionally include a dispensing mechanism 740 that promotes contact between the solid reactant 500 and the liquid reactant 610 flowing out of the liquid dispenser outlet 720. This dispensing mechanism 740 is preferably a nozzle disposed on one end of the solid reactant 500, but may be a plurality of nozzles disposed at several locations along the reaction area 400, a nozzle inserted into the solid reactant 500, a wick on one end of the solid reactant 500, or an elastic envelope surrounding the solid reactant 500. The liquid dispenser 700 may be mobile, such that it moves as the liquid storage area 600 and reaction area 400 change volumes, or may be stationary, such that it is anchored to the outer container 200.

The product collection area 800 of the fuel supply 100 of the preferred embodiment functions to receive the reaction components 830 generated by the fuel-generating reaction. The product collection area 800 is fluidly coupled to the reaction area 400, and is preferably coupled by a flexible channel, but may alternatively be coupled by a diffusion membrane, a tube, a rigid channel, another liquid dispenser 700, or by having the reaction area 400 located within the product collection with no barriers 300 between the two areas such that reaction products directly flow into the product collection area 800. The product collection area 800 may be unbounded such that it is not exactly defined within the outer container 200, but is preferably bounded and defined by a barrier 300. The product collection area 800 preferably occupies a small portion of the outer container's 200 inner volume 210 before the liquid and solid reactants 610 and 500, respectively, are reacted (as shown in FIG. 1A), and preferably expands in volume as the fuel supply 100 is operated (wherein the solid and liquid reactants 610 are consumed and reaction components 830 are produced), as shown in FIG. 1B. The reaction components 830 received by the product collection area 800 include reaction products and unreacted reactants. For example, in a sodium borohydride-hydrogen generation system, the reaction components 830 include hydrogen gas, sodium metaborate ($NaBO_2$), unreacted sodium borohydride, and unreacted water. In a lithium aluminum hydride (LAH) hydrogen generation system, the reaction components 830 include hydrogen gas, lithium hydroxide, aluminum hydroxide, unreacted LAH, and unreacted water. The product collector is preferably fluidly coupled to an outlet 820 or valve in the outer container 200 to allow generated fuel to flow out of the fuel supply 100. The product collection area 800 may additionally include a product filter 810 that functions to separate desired reaction products from the reaction components 830 and to adsorb the unwanted reaction components 830. This product filter 810 may make the product collection area 800 orientation independent, as it adsorbs the aqueous reaction components 830 in a designated area such that they do not flow into other areas of the fuel supply 100. The product filter 810 is preferably similar to the filter for product separation described in U.S. Ser. No. 12/460,794, which is incorporated in its entirety by this reference, but may alternatively be other filters as well. The product filter 810 is preferably porous, but may be alternatively/additionally fibrous. The product filter 810 is preferably composed of a series of filters wherein the filter pore sizes decrease with distance from the reaction area 400 couple. Alternately, the product filter 810 may be a single filter wherein the size of its pores decreases with increasing distance from the reaction area 400 couple, or a single filter with various coatings that change the product filler's 810 adsorption characteristics along its length. The product filter 810 is preferably hydrophilic, but may alternatively be hydrophobic as well, depending on the chemical characteristics of the reaction components 830 to be adsorbed. The product filter 810 is preferably compressible, such that it is compressed when the product collection area 800 initially occupies a small portion of the outer container's 200 inner volume 210 and expands as it adsorbs reaction components 830. The product filter 810 is preferably compressible down to 100 times smaller than its expanded volume, but may be compressible down to 50 times smaller, 25 times smaller, 10 times smaller, 2 times smaller, or any amount of compression. The product filter 810 is preferably made of nylon, but may alternatively include activated carbon, PTFE, polyolefins, or any other materials that can adsorb the reaction components 830 without being corroded. Alternately, the product filter 810 may be comprised of materials that corrode to form the desired fuel moiety, such as aluminum. Additionally, the product filter 810 may include a gas separator 820 that is preferably made of ePTFE and separates out hydrogen gas, but may be made of alternate materials and separate out other gasses.

Figure 5:
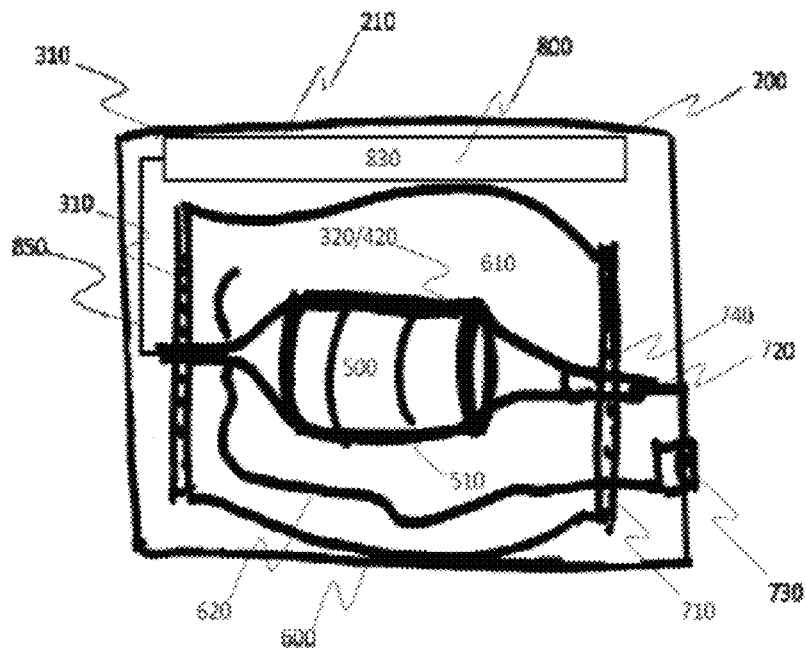
Figure 6A:
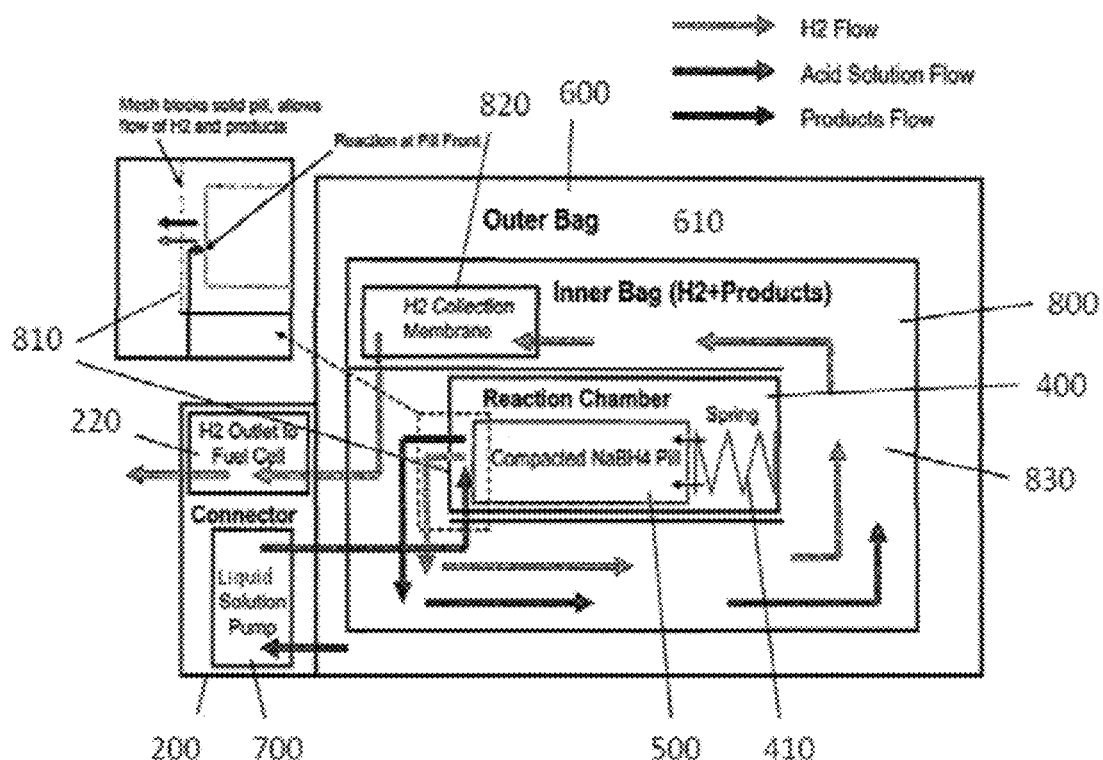
FIGS. 6A and 6B are schematic representations of a front and angled view of a fourth embodiment of the fuel supply in operation, respectively.
Figure 6B:
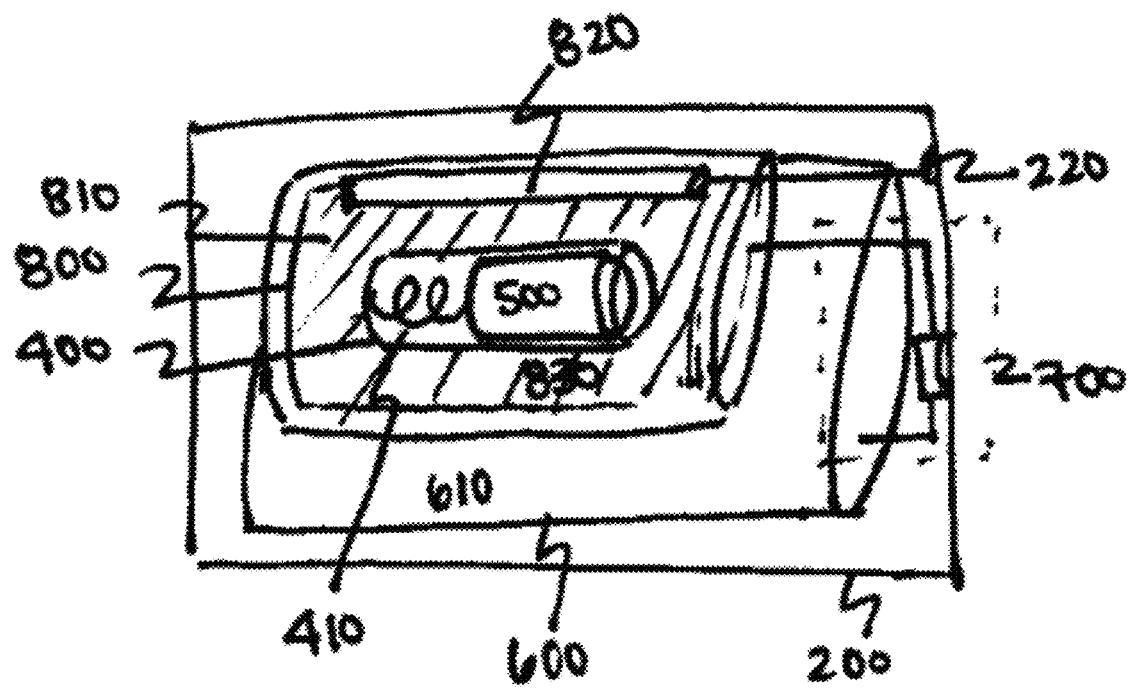
Figure 7:
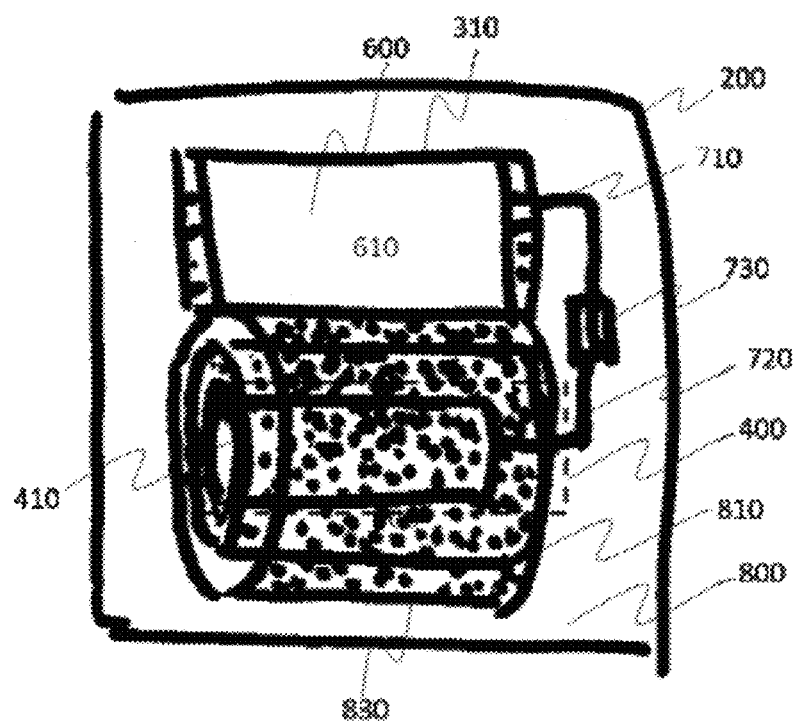
FIG. 7 is a schematic representation of a fifth embodiment of the fuel supply in operation.

The reaction area 400, liquid storage area 600, and product collection area 800 are preferably arranged within the outer container 200 such that the area volumes are easily exchanged, wherein the areas may or may not be defined and/or enclosed by a barrier 300. As shown in FIGS. 1A and 1B, the fuel supply 100 of the first preferred embodiment includes the reaction area 400 enclosed with an elastic barrier 300, the liquid storage area 600 with most of the air removed and enclosed in a flexible bag 310, and the product collection area 800 including a product filter 810 with varying porosities and enclosed in a flexible bag 310, wherein the reaction area 400, liquid storage area 600, and product collection area 800 are located next to each other within the outer container 200. As shown in FIG. 4, the fuel supply 100 of a second preferred embodiment includes the reaction area 400 with a grooved solid reactant 500 enclosed in a flexible bag 310 with a spring 410 as a biasing mechanism, the liquid storage area 600 including a long flexible tube and enclosed in a flexible bag 310, and the product collection area 800 bounded only by the inner walls of the outer container 200, wherein the liquid storage area 600 is disposed around reaction area 400. As shown in FIG. 5, the fuel supply 100 of a third preferred embodiment is similar to the second preferred embodiment, but the biasing mechanism is an elastic membrane 420 surrounding the solid reactant 500, and the fuel supply 100 additionally includes a barrier 300 enclosing the product collection area 800 such that it is separate from and adjacent to the liquid storage area 600. As shown in FIGS. 6A and 6B, the fuel supply 100 of a fourth preferred embodiment comprises of the reaction area 400 enclosed in a bag and including a solid reactant 500-biasing spring 410, the product collector area enclosed in a bag, and the liquid storage area 600 enclosed in a bag, wherein the reaction area 400 is contained within the product collection area 800 with the liquid storage area 600 disposed next to the product collection area 800 within the outer container 200 (such as the hydrogen generation system described in U.S. Ser. No. 12/501,675, which is incorporated in its entirety by this reference). As shown in FIG. 7, the fuel supply 100 of a fifth preferred embodiment includes the liquid storage area 600 enclosed by a flexible bag 310, and the product collection area 800 enclosed by a flexible bag 310 that includes a product filter 810, wherein the unbounded reaction area 400 is contained within the product collection area 800 and substantially surrounded by the product filter 810.

As a person skilled in the art will recognize from the previous detailed description and from the figures and claims, modifications and changes can be made to the preferred embodiments of the invention without departing from the scope of this invention defined in the following claims.

We claim:
1. A fuel supply for a fuel cell, comprising:
a liquid storage area that includes a liquid reactant;
a reaction area that includes a solid reactant, wherein the liquid reactant is pumped into the reaction area such that the liquid reactant reacts with the solid reactant to produce reaction components;
a product collection area that receives the reaction components;
a barrier that separates the liquid storage area from the product collection area and moves to simultaneously increase the product collector area and decrease the liquid storage area as the liquid reactant is pumped from the liquid storage area and the reaction components are transferred into the product collection area; and
a container with an interior volume that substantially encloses the reaction area, liquid storage area, and product collection area;
wherein the product collection area is fluidly coupled to the reaction area by the flexible channel and includes a product filter that adsorbs the liquid and solid components; and
wherein the product filter comprises of a series of open-cell foams with different pore sizes, wherein the pore sizes of the foams decrease with increasing distance from the flexible channel.

2. The fuel supply of claim 1, wherein the interior volume is substantially occupied by the reaction area, liquid storage area, and product collection area.

3. The fuel supply of claim 2, further comprising a second barrier that encloses the solid reactant, such that the second barrier collapses as reaction components are produced.

4. The fuel supply of claim 1, wherein the container includes a product outlet fluidly coupling the interior volume to the exterior of the container.

5. The fuel supply of claim 1, wherein the reaction area further includes a biasing mechanism that biases the solid reactant toward the pumped liquid reactant.

6. The fuel supply of claim 5, wherein the biasing mechanism encloses the solid reactant such that the biasing mechanism collapses as the reaction components are produced.

7. The fuel supply of claim 6, wherein the second barrier is an elastic membrane that substantially envelopes the solid reactant.

8. The fuel supply of claim 1, wherein the solid reactant is a compacted pill of sodium borohydride.

9. The fuel supply of claim 8, wherein the liquid reactant is water.

10. The fuel supply of claim 5, wherein the solid reactant includes a reaction product path that moves reaction products to the product collector, wherein the reaction product path is selected from the group consisting of one channel disposed on a surface of the solid reactant, one channel disposed through the solid reactant, one helix channel disposed around the solid reactant, a contained region disposed around the solid reactant, and one conduit abutting the solid reactant.

11. The fuel supply of claim 5, wherein the reaction area is substantially contained in the liquid storage area.

12. The fuel supply of claim 11, wherein the liquid storage area is substantially contained in the product collection area.

13. The fuel supply of claim 3 further comprising a liquid dispenser that pumps the liquid reactant from the liquid storage area into the reaction area; wherein the liquid dispenser includes a nozzle through the second barrier through which liquid reactant is pumped into the reaction area.

14. The fuel supply of claim 1, wherein the reaction components include a liquid component, a solid component, and a gaseous component.

15. The fuel supply of claim 1, wherein the product filter is nylon foam.

16. The fuel supply of claim 15, wherein the product filter further comprises a hydrogen gas separator.

17. The fuel supply of claim 16, wherein the hydrogen gas separator is made of ePTFE.

18. The fuel supply of claim 1, wherein the barrier is a bag enclosing the liquid storage area.

19. The fuel supply of claim 1, wherein the fuel supply further comprises a third barrier that encloses the product collection area, wherein the third barrier expands as the product collector area increases.

20. The fuel supply of claim 1 further comprising a liquid dispenser that pumps the liquid reactant from the liquid storage area into the reaction area, such that the liquid reactant reacts with the solid reactant to produce reaction components.

21. The fuel supply of claim 20, wherein the liquid dispenser comprises an inlet fluidly coupled to the liquid storage area, an outlet fluidly coupled to the reaction area, and a surface in fluid communication with the inlet and outlet, wherein the surface moves to pump the liquid reactant from the liquid storage area to the reaction area.

22. The fuel supply of claim 21, wherein the liquid storage area is under vacuum.

23. The fuel supply of claim 22, wherein the liquid dispenser inlet is a tube in the liquid storage area, wherein the tube is fluidly coupled to a flexible plastic thread with a length as long as the longest dimension of the liquid storage area and a diameter substantially smaller than the length of the tube.

24. The fuel supply of claim 21, wherein the surface is a flexible diaphragm that reciprocates to pump the liquid reactant.

25. The fuel supply of claim 1, wherein the container is rigid.

26. The fuel supply of claim 1, wherein: the fuel supply further comprises a biasing mechanism that substantially envelops the reaction area; the solid reactant includes a helix channel disposed around the solid reactant that guides the reaction composition to the product collection area; the liquid dispenser includes an inlet fluidly coupled to the liquid storage area, an outlet fluidly coupled to the reaction area, and a diaphragm in fluid communication with the inlet and outlet, wherein the diaphragm reciprocates to pump the liquid reactant from the liquid storage area to the reaction area; and the product collection area further includes an open cell foam that significantly adsorbs the reaction components.

27. The fuel supply of claim 26, wherein the fuel supply is coupled to a fuel cell.

* * * * *